(12) United States Patent
Feng et al.

(10) Patent No.: US 11,233,928 B2
(45) Date of Patent: Jan. 25, 2022

(54) INTEGRATED DISPLAY PANEL, DISPLAY APPARATUS AND IMAGE DISPLAY METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Xiang Feng, Beijing (CN); Sha Liu, Beijing (CN); Qiang Zhang, Beijing (CN); Zhaokun Yang, Beijing (CN); Xiao Sun, Beijing (CN); Yun Qiu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 850 days.

(21) Appl. No.: 16/066,429

(22) PCT Filed: Dec. 22, 2017

(86) PCT No.: PCT/CN2017/118009
§ 371 (c)(1),
(2) Date: Jun. 27, 2018

(87) PCT Pub. No.: WO2018/176936
PCT Pub. Date: Oct. 4, 2018

(65) Prior Publication Data
US 2021/0176381 A1    Jun. 10, 2021

(30) Foreign Application Priority Data
Mar. 31, 2017  (CN) .......................... 201710210638.1

(51) Int. Cl.
*H04N 5/225*  (2006.01)
*G09G 3/20*   (2006.01)
(Continued)

(52) U.S. Cl.
CPC ............. *H04N 5/2257* (2013.01); *G09G 3/20* (2013.01); *H04N 5/2251* (2013.01);
(Continued)

(58) Field of Classification Search
CPC ...... H04N 5/2257; H04N 9/04; H04N 5/2251; H04N 5/23293; H04N 5/247; H04N 5/23216; G09G 3/20
See application file for complete search history.

(56) References Cited

U.S. PATENT DOCUMENTS

2009/0009628 A1\* 1/2009 Janicek ................. H04N 7/144
348/231.99
2015/0248210 A1\* 9/2015 Lee ..................... H04N 21/4436
345/593
(Continued)

FOREIGN PATENT DOCUMENTS

| CN | 104505019 A | 4/2015 |
|---|---|---|
| CN | 104952425 A | 9/2015 |

(Continued)

OTHER PUBLICATIONS

Search Report and Written Opinion for International Application No. PCT/CN2017/118009 dated Mar. 7, 2018.
(Continued)

*Primary Examiner* — Mekonnen D Dagnew
(74) *Attorney, Agent, or Firm* — Calfee, Halter & Griswold LLP (57) ABSTRACT

An integrated display panel, a display apparatus and an image display method. The integrated display panel includes a display substrate and a plurality of photodiodes located in
(Continued)

the display substrate, at least part of the plurality of photodiodes being configured to acquire light signals of a target area and convert the acquired light signals of the target area into electric signals for forming a target area image.

10 Claims, 4 Drawing Sheets

(51) Int. Cl.
*H04N 5/232* (2006.01)
*H04N 5/247* (2006.01)
*H04N 9/04* (2006.01)

(52) U.S. Cl.
CPC ..... *H04N 5/23216* (2013.01); *H04N 5/23293* (2013.01); *H04N 5/247* (2013.01); *H04N 9/04* (2013.01)

(56) References Cited

U.S. PATENT DOCUMENTS

| | | |
|---|---|---|
| 2016/0071442 A1 | 3/2016 | Joffer et al. |
| 2017/0193972 A1 | 7/2017 | Gao et al. |
| 2018/0018916 A1 | 1/2018 | Chung |

FOREIGN PATENT DOCUMENTS

| | | |
|---|---|---|
| CN | 105118442 A | 12/2015 |
| CN | 105551428 A | 5/2016 |
| CN | 106998418 A | 8/2017 |

OTHER PUBLICATIONS

First Office Action for Chinese Patent Application No. 201710210638.1 dated Feb. 19, 2019.

* cited by examiner

Receive the settings of the number of cameras and the resolution of each of the cameras by the camera setting circuit in the display apparatus, wherein the number of the cameras is N, and the resolution of the i-th camera is Xi, wherein i=1, 2, ..., N, and N is an integer greater than or equal to 1 — S11

Group the plurality of photodiodes in the integrated display panel according to the number of the cameras and the resolution of each of the cameras, such that the number of groups of the photodiodes is equal to the number of the cameras — S21

Acquire light signals of a target area by the photodiodes in the image acquisition circuits of N cameras, and convert the acquired light signals of the target area into electric signals for forming the target area image, to get N electric signals for forming the target area image — S31

Process the N electric signals for forming the target area image respectively by the signal processing circuit in the display apparatus, to get the source file information of N acquired target area sub-images, and process the source file information of the N target area sub-images to attain the RGB potential signal of the target area image — S41

Fig.6

Set the number of groups of sub-pixels by the first setting circuit according to the number N of the cameras, such that the number of the groups of sub-pixels is equal to the number of the cameras — S211

Get the number of sub-pixels in which a photodiode is disposed in the group of sub-pixels corresponding to each of the cameras by the second setting circuit according to the resolution of each of the cameras, such that the number of the sub-pixels in which a photodiode is disposed in the group of sub-pixels corresponds to the resolution of the corresponding camera — S212

Group the sub-pixels in which a photodiode is disposed by the grouping circuit according to the number of the groups of sub-pixels and the number of the sub-pixels in which a photodiode is disposed in each of the groups of sub-pixels — S213

Fig.7

INTEGRATED DISPLAY PANEL, DISPLAY APPARATUS AND IMAGE DISPLAY METHOD

RELATED APPLICATIONS

The present application is the U.S. national phase entry of PCT/CN2017/118009, with an international filing date of Dec. 22, 2017, which claims the benefit of Chinese Patent Application No. 201710210638.1, filed on Mar. 31, 2017, the entire disclosures of which are incorporated herein by reference.

TECHNICAL FIELD

Embodiments of the disclosure relate to the field of display technology, and in particular, to an integrated display panel, a display apparatus and an image display method.

BACKGROUND OF THE INVENTION

With the increasing demands of users for using mobile electronic devices for performing functions of video call, taking self-photos, etc., display screens of more and more mobile electronic devices have a front camera.

Nowadays, the front camera on the display screen of a mobile electronic device has been developed to a dual camera level. However, both the two front cameras on the display screen of the existing mobile electronic device are formed by existing cameras with a fixed resolution being fixedly installed in the mobile electronic device, such that the resolution of the front cameras on the display screen of the mobile electronic device is also fixed, resulting in that the user cannot adjust the resolution of the front cameras on the display screen of the mobile electronic device according to his own needs, and the user satisfaction is poor.

SUMMARY

An embodiment of the disclosure provides an integrated display panel including a display substrate and a plurality of photodiodes located in the display substrate, at least part of the plurality of photodiodes being configured to acquire light signals of a target area and convert the acquired light signals of the target area into electric signals for forming a target area image.

In some embodiments, the display substrate includes a plurality of sub-pixels, in each of which is disposed at least one of the plurality of photodiodes.

In some embodiments, the display substrate includes Q sub-pixels grouped into M pixel units, of which each includes K sub-pixels, wherein Q=K*M, and Q, M and K are integers greater than or equal to 1, in each of the pixel units are disposed F photodiodes, the F photodiodes in each of the pixel units are located in the same sub-pixel, and in every K pixel units arranged in sequence, the F photodiodes of an i-th pixel unit are located in an i-th sub-pixel of the i-th pixel unit, wherein F is an integer greater than or equal to 1, and i is a positive integer less than or equal to K.

An embodiment of the disclosure further provides a display apparatus including an integrated display panel as described above and a signal processing circuit coupled to each of the photodiodes in the integrated display panel, which signal processing circuit is configured to process photoelectric signals obtained by at least part of the plurality of photodiodes for forming a target area image, to get a RGB potential signal of the target area image, and cause the integrated display panel to display the target area image.

In some embodiments, the plurality of photodiodes form an image acquisition circuit of at least one camera, the display apparatus further includes a camera setting circuit coupled to the integrated display panel, which camera setting circuit is configured to receive the settings of the number of cameras in the integrated display panel and the resolution of each of the cameras, and group the plurality of photodiodes in the integrated display panel according to the number of the cameras and the resolution of each of the cameras, such that the number of groups of the photodiodes is equal to the number of the cameras, and the signal processing circuit is configured to process electric signals obtained by individual groups of the plurality of photodiodes for forming the target area image, to get source file information of a plurality of target area sub-images corresponding to a plurality of groups of photodiodes, and process the source file information of the plurality of target area sub-images, to attain the RGB potential signal of the target area image.

In some embodiments, the display substrate includes a plurality of sub-pixels, and the photodiodes are located in the sub-pixels.

The camera setting circuit includes a first setting circuit, a second setting circuit and a grouping circuit, the first setting circuit is configured to set the number of groups of sub-pixels according to the number of the cameras, such that the number of the groups of sub-pixels is equal to the number of the cameras, the second setting circuit is configured to get the number of sub-pixels in which a photodiode is disposed in the group of sub-pixels corresponding to each of the cameras according to the resolution of each of the cameras, such that the number of the sub-pixels in which a photodiode is disposed in the group of sub-pixels corresponds to the resolution of the corresponding camera, and the grouping circuit is configured to group the sub-pixels in which a photodiode is disposed according to the number of the groups of sub-pixels and the number of the sub-pixels in which a photodiode is disposed in each of the groups of sub-pixels.

In some embodiments, the signal processing circuit includes a photoelectric signal processing circuit, an image signal processing circuit and an information compiling circuit coupled in sequence, the photoelectric signal processing circuit is configured to process electric signals obtained by the plurality of groups of photodiodes for forming the target area image respectively, to get the source file information of the plurality of target area sub-images, the image signal processing circuit is configured to synthesize the source file information of the plurality of target area sub-images, to attain the source file information of the target area image, and the information compiling circuit is configured to get the RGB potential signal of the target area image according to the source file information of the target area image.

In some embodiments, the display apparatus further includes a display driving circuit integrated together with the signal processing circuit, which display driving circuit is coupled to the integrated display panel, and configured to receive the RGB potential signal of the target area image sent by the signal processing circuit and drive the integrated display panel to display the target area image according to the RGB potential signal of the target area image.

An embodiment of the disclosure further provides an image display method for displaying a target area image acquired by a display apparatus described above, which method includes processing electric signals obtained by at least part of the plurality of photodiodes for forming the target area image to get a RGB potential signal of the target area image, and displaying the target area image according to the RGB potential signal of the target area image.

In some embodiments, the plurality of photodiodes form an image acquisition circuit of at least one camera, the display apparatus includes a camera setting circuit coupled to the photodiodes, which camera setting circuit is configured to receive the settings of the number of cameras in the integrated display panel and the resolution of each of the cameras, and group the plurality of photodiodes in the integrated display panel according to the number of the cameras and the resolution of each of the cameras, such that the number of groups of the photodiodes is equal to the number of the cameras, and a specific step of processing electric signals obtained by at least part of the plurality of photodiodes for forming the target area image to get a RGB potential signal of the target area image includes: receiving the settings of the number of cameras and the resolution of each of the cameras by the camera setting circuit in the display apparatus, wherein the number of the cameras is N, and the resolution of the i-th camera is $X_i$, wherein i=1, 2, ..., N, and N is an integer greater than or equal to 1, grouping the plurality of photodiodes in the integrated display panel according to the number of the cameras and the resolution of each of the cameras, such that the number of groups of the photodiodes is equal to the number of the cameras, acquiring light signals of a target area by the photodiodes in the image acquisition circuits of N cameras as described, and converting the acquired light signals of the target area into electric signals for forming the target area image, to get N electric signals for forming the target area image, and processing the N electric signals for forming the target area image respectively by the signal processing circuit in the display apparatus, to get the source file information of N acquired target area sub-images, and processing the source file information of the N target area sub-images to attain the RGB potential signal of the target area image.

In some embodiments, the display substrate includes a plurality of sub-pixels, the photodiodes are disposed in the sub-pixels, and the camera setting circuit includes a first setting circuit, a second setting circuit and a grouping circuit, a specific step of grouping the plurality of photodiodes in the integrated display panel according to the number of the cameras and the resolution of each of the cameras, such that the number of groups of the photodiodes is equal to the number of the cameras, includes: setting the number of groups of sub-pixels by the first setting circuit according to the number N of the cameras, such that the number of the groups of sub-pixels is equal to the number of the cameras, getting the number of sub-pixels in which a photodiode is disposed in the group of sub-pixels corresponding to each of the cameras by the second setting circuit according to the resolution of each of the cameras, such that the number of the sub-pixels in which a photodiode is disposed in the group of sub-pixels corresponds to the resolution of the corresponding camera, and grouping the sub-pixels in which a photodiode is disposed by the grouping circuit according to the number of the groups of sub-pixels and the number of the sub-pixels in which a photodiode is disposed in each of the groups of sub-pixels.

In some embodiments, the signal processing circuit includes a photoelectric signal processing circuit, an image signal processing circuit and an information compiling circuit coupled in sequence, a specific step of processing the N electric signals for forming the target area image respectively, to get the source file information of N acquired target area sub-images, and processing the source file information of the N target area sub-images to attain the RGB potential signal of the target area image, includes: processing the N electric signals for forming the target area image respectively by the photoelectric signal processing circuit, to get the source file information of N target area sub-images, synthesizing the source file information of the N target area sub-images by the image signal processing circuit, to attain the source file information of the target area image, and getting the RGB potential signal of the target area image by the information compiling circuit according to the source file information of the target area image.

The content of the embodiments of the disclosure is provided to introduce a selection of concepts that are further described below in the Detailed Description section. This Summary is not intended to identify key features or essential features of the claimed subject matter, nor is it intended to be used to limit the scope of the claimed subject matter. In addition, the claimed subject matter is not limited to implementations that solve any or all of the noted disadvantages in any section of the disclosure.

BRIEF DESCRIPTION OF THE DRAWINGS

In order to more clearly illustrate the technical solutions in the embodiments of the disclosure or related art, the appended drawings required to be used in the description of the embodiments will be introduced briefly in the following. Obviously, the drawings in the following description are just some embodiments of the disclosure. For the person having ordinary skills in the art, other drawings may also be gotten according to these drawings under the premise of not paying out undue experimentation.

FIG. 6 is a flow chart of a method for getting a RGB potential signal of a target area image provided by an embodiment of the disclosure.

FIG. 7 is a flow chart of a method for grouping a plurality of photodiodes in an integrated display panel provided by an embodiment of the disclosure.

DETAILED DESCRIPTION

In the following the technical solutions in the embodiments of the disclosure will be described clearly and completely in conjunction with the drawings in the embodiments of the disclosure. Obviously, the described embodiments are just a part of the embodiments of the disclosure, and not all the embodiments. Based on the embodiments of the disclosure, all the other embodiments gotten by the person having ordinary skills in the art under the premise of not paying out undue experimentation pertain to the scope protected by the disclosure.

Figure 1:
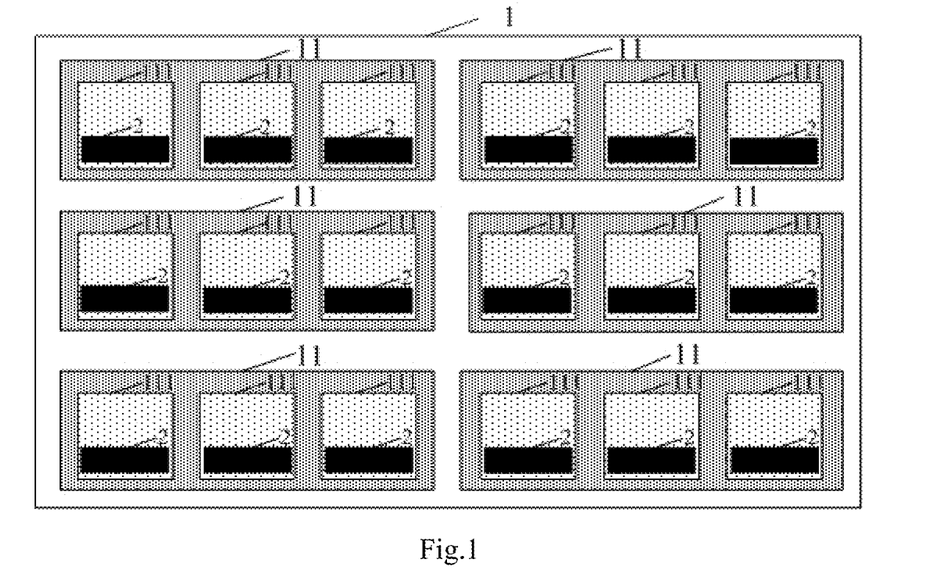
FIG. 1 is a structure diagram of a first integrated display panel provided by an embodiment of the disclosure.

An embodiment of the disclosure provides an integrated display panel, and in particular, as shown in FIG. 1, the integrated display panel includes a display substrate 1 and a plurality of photodiodes 2 located in the display substrate 1, at least part of the plurality of photodiodes 2 being configured to acquire light signals of a target area and convert the acquired light signals of the target area into electric signals for forming a target area image.

In the process of using the integrated display panel, when all of the photodiodes 2 in the display substrate 1 are used to acquire light signals of the target area and convert the acquired light signals of the target area into electric signals for forming the target area image, the resolution of the acquired target area image is the highest, and when a user needs to acquire a target area image with a lower resolution, it may be possible to let only part of the photodiodes 2 in the display substrate 1 be used for acquiring light signals of the target area according to the target resolution of the user, and converting the acquired light signals of the target area into electric signals for forming the target area image.

In the integrated display panel, the plurality of photodiodes 2 which acquire photoelectric signals of the target area image are formed in the display substrate 1, and at least part of the plurality of photodiodes 2 are used for acquiring light signals of the target area and converting the acquired light signals of the target area into electric signals for forming the target area image, which causes that during use, the user can, according to his own needs, choose at least part of the photodiodes 2 for acquiring light signals of the target area and converting the acquired light signals of the target area into electric signals for forming the target area image, and by adjusting the number of the chosen photodiodes 2, it may be possible to adjust the resolution of a camera in the integrated display panel, thereby improving the user satisfaction.

Exemplarily, as shown in FIG. 1, the display substrate 1 includes a plurality of sub-pixels 111, and in each of the sub-pixels 111 is included at least one photodiode 2.

For example, as shown in FIG. 1, the display substrate 1 includes 18 sub-pixels 111, the 18 sub-pixels 111 include 6 R sub-pixels, 6 G sub-pixels and 6 B sub-pixels, in each of the sub-pixels 111 is disposed one photodiode 2, the 18 sub-pixels 111 may form 6 pixel units 11, and each of the pixel units 11 includes one R sub-pixel, one G sub-pixel and one B sub-pixel. After a user selects the number of cameras in the integrated display panel and the resolution of each of the cameras, it may be possible to segment the sub-pixels 111 in the pixel units 11. Since each of the sub-pixels 111 includes one photodiode 2, to segment the sub-pixels 111 is just to segment the photodiodes 2, such that the number of groups of the segmented sub-pixels 111 is the same as the set number of cameras, and the number of sub-pixels 111 in each group of sub-pixels 111 corresponds to the resolution of a corresponding camera, which forms a plurality of cameras with selected resolutions, and thereby meets different demands of each user for the number of cameras and the resolution of each of the cameras.

Figure 2:
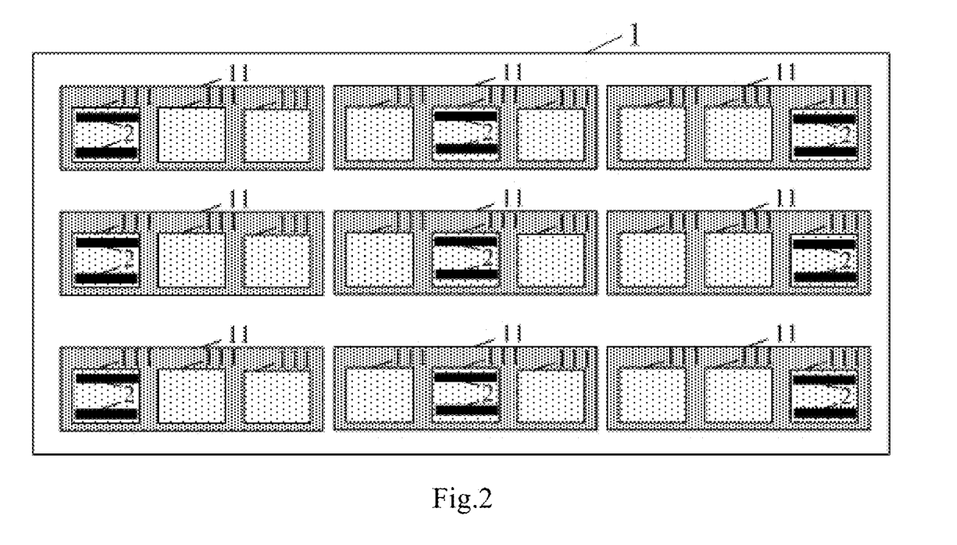
FIG. 2 is a structure diagram of a second integrated display panel provided by an embodiment of the disclosure.

Exemplarily, as shown in FIG. 2, the display substrate 1 may include Q sub-pixels 111 grouped into M pixel units 11, of which each includes K sub-pixels 111, wherein Q=K*M, and Q, M and K are integers greater than or equal to 1.

Exemplarily, in each of the pixel units 11 are disposed F photodiodes 2, the F photodiodes 2 disposed in each of the pixel units 11 are located in the same sub-pixel 111, and in every K pixel units 11 arranged in sequence from the beginning, the F photodiodes 2 of an i-th pixel unit 11 are located in an i-th sub-pixel 111 of the i-th pixel unit 11, wherein F is an integer greater than or equal to 1, and i is a positive integer less than or equal to K. For example, as shown in FIG. 2 and FIG. 3, the display substrate 1 may include 27 sub-pixels 111, the 27 sub-pixels 111 include 9 R sub-pixels, 9 G sub-pixels and 9 B sub-pixels, the 27 sub-pixels 111 may be arranged in a matrix of 9 columns and 3 rows, or also may be arranged in a matrix of 3 columns and 9 rows, the 27 sub-pixels 111 form 9 pixel units 11, each of the pixel units 11 includes 3 sub-pixels 111, particularly, one R sub-pixel, one G sub-pixel and one B sub-pixel, in each of the pixel units 11 are disposed 2 photodiodes 2, the 2 photodiodes 2 disposed in each of the pixel units 11 are located in the same sub-pixel 111, and in every 3 pixel units 11, the 2 photodiodes 2 of a first pixel unit are located in a first sub-pixel 111 of the first pixel unit, the 2 photodiodes of a second pixel unit are located in a second sub-pixel 111 of the second pixel unit, and the 2 photodiodes of a third pixel unit are located in a third sub-pixel 111 of the third pixel unit.

For example, as shown in FIG. 2, along the row direction of the matrix, every 3 sub-pixels 111 (including one R sub-pixel, one G sub-pixel and one B sub-pixel therein) form a pixel unit 11, and then in the 3 pixel units 11 in any row, 2 photodiodes are disposed in the first sub-pixel 111 (the R sub-pixel) in the first pixel unit 11, 2 photodiodes are disposed in the second sub-pixel 111 (the G sub-pixel) in the second pixel unit 11, and 2 photodiodes are disposed in the third sub-pixel 111 (the B sub-pixel) in the third pixel unit 11.

Figure 3:
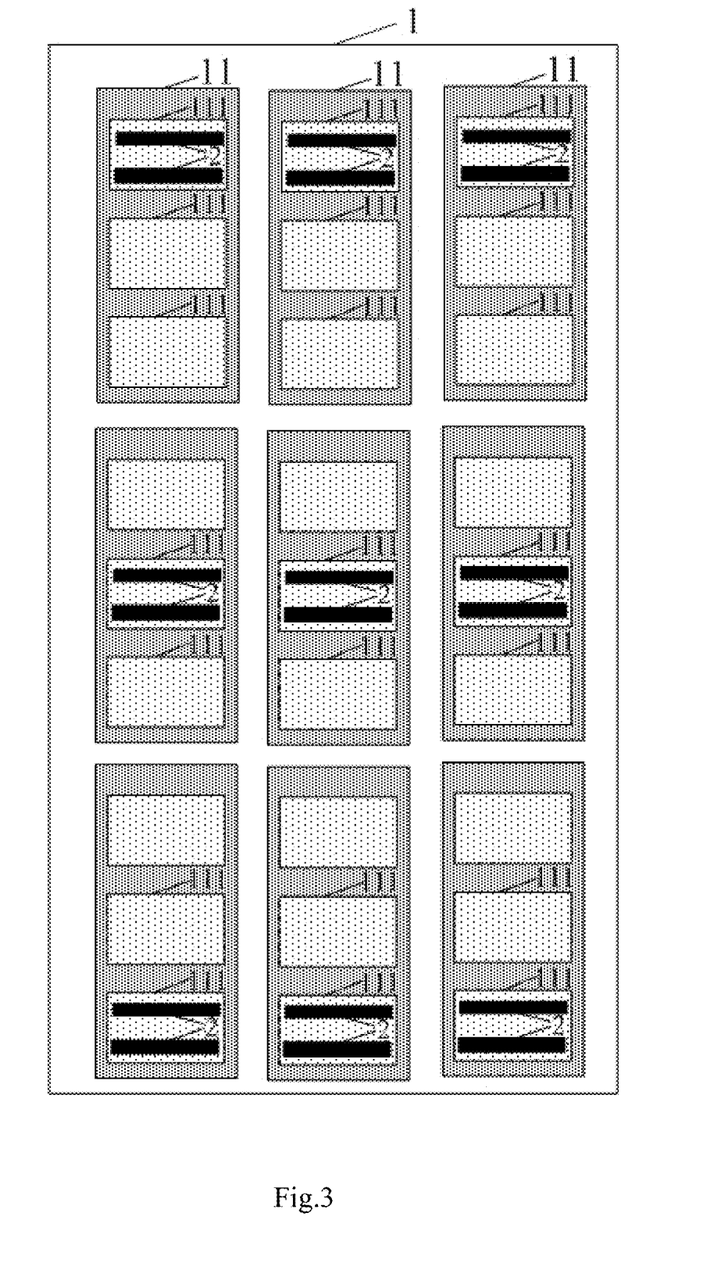
FIG. 3 is a structure diagram of a third integrated display panel provided by an embodiment of the disclosure.

Likewise, as shown in FIG. 3, along the column direction of the matrix, every 3 sub-pixels 111 (including one R sub-pixel, one G sub-pixel and one B sub-pixel therein) form a pixel unit 11, and then in the 3 pixel units 11 in any column, 2 photodiodes are disposed in the first sub-pixel 111 (the R sub-pixel) in the first pixel unit 11, 2 photodiodes are disposed in the second sub-pixel 111 (the G sub-pixel) in the second pixel unit 11, and 2 photodiodes are disposed in the third sub-pixel 111 (the B sub-pixel) in the third pixel unit 11.

It is noted that, the settings of the number of sub-pixels in a pixel unit in the display substrate and the number and positions of photodiodes in each pixel unit are not limited to the above, and they may be set by the skilled in the art according to the kind of the specific integrated display panel, which will not be defined by the embodiments of the disclosure.

In addition, in the technique known to the inventors, a camera including a number of photodiodes is fixedly installed at a fixed position of an integrated display panel. As compared to this, by distributing a plurality of photodiodes of a camera in a plurality of pixel units of the display substrate, the embodiments of the disclosure may further enlarge the photosensitive area of the photodiodes in the camera, and improve the photosensitive performance of the camera in the integrated display panel under weak light.

An embodiment of the disclosure further provides a method for producing an integrated display panel as described above. In particular, the method for producing an integrated display panel includes forming a plurality of photodiodes in the display panel, at least part of the plurality of photodiodes being configured to acquire light signals of a target area and convert the acquired light signals of the target area into electric signals for forming a target area image.

The method for producing an integrated display panel has the same advantages as the integrated display panel in the above embodiments, which will not be repeated here any longer.

On one hand, when the display substrate includes a plurality of sub-pixels and in each of the sub-pixels is disposed at least one photodiode, the forming a plurality of photodiodes in the display panel may specifically include the following steps.

At step S1a, a first substrate base-plate is provided, and the plurality of sub-pixels are formed in the first substrate base-plate, wherein in each of the sub-pixels is disposed at least one photodiode.

Exemplarily, as shown in FIG. 1, in the 18 sub-pixels 111 formed in the first substrate base-plate, each of the sub-pixels 111 contains one photodiode 2, and the thin film transistor and the photodiode 2 in the same sub-pixel are coupled to the same data line respectively, which may thus simplify the driving circuit structure in the integrated display panel, and in turn simplify the production process of the integrated display panel.

At step S2a, a second substrate base-plate is formed on the surfaces of a plurality of pixel units away from the first substrate base-plate.

At step S3a, a plurality of lenses in a one-to-one correspondence with the photodiodes are formed in the second substrate base-plate, of which lenses each is used for obtaining light of a target area.

On the other hand, when the display substrate includes Q sub-pixels grouped into M pixel units, of which each includes K sub-pixels, wherein Q=K*M, and Q, M and K are integers greater than or equal to 1, and in each of the pixel units are disposed F photodiodes, the F photodiodes in each of the pixel units are located in the same sub-pixel, and in every K pixel units arranged in sequence, the F photodiodes of an i-th pixel unit are located in an i-th sub-pixel of the i-th pixel unit, wherein F is an integer greater than or equal to 1, and i is a positive integer less than or equal to K, the forming a plurality of photodiodes in the display panel may further specifically include: step S1b, providing a first substrate base-plate, and forming Q sub-pixels in the first substrate base-plate, such that the Q sub-pixels are grouped into M pixel units, and each of the pixel units includes K sub-pixels, wherein Q=K*M, and Q, M and K are integers greater than or equal to 1, and in each of the pixel units are contained F photodiodes, the F photodiodes contained in each of the pixel units are located in the same sub-pixel, and in every K pixel units arranged in sequence from the beginning, the F photodiodes of an i-th pixel unit are located in an i-th sub-pixel of the i-th pixel unit, wherein F is an integer greater than or equal to 1, and i is a positive integer less than or equal to K, step S2b, forming a second substrate base-plate on the surfaces of the plurality of pixel units away from the first substrate base-plate, and step S3b, forming a plurality of lenses in a one-to-one correspondence with the photodiodes in the second substrate base-plate, of which lenses each is used for obtaining light of a target area.

Exemplarily, as shown in FIG. 2 and FIG. 3, on the first substrate base-plate are formed 27 sub-pixels 111, the 27 sub-pixels 111 include 9 R sub-pixels, 9 G sub-pixels and 9 B sub-pixels, the 27 sub-pixels 111 may be arranged in a matrix of 9 columns and 3 rows, or also may be arranged in a matrix of 3 columns and 9 rows, the 27 sub-pixels 111 form 9 pixel units 11, each of the pixel units 11 includes 3 sub-pixels 111 (including one R sub-pixel, one G sub-pixel and one B sub-pixel therein), in each of the pixel units 11 are disposed 2 photodiodes 2, the 2 photodiodes 2 disposed in each of the pixel units 11 are located in the same sub-pixel 111, and in every 3 pixel units 11, the 2 photodiodes 2 of a first pixel unit are located in a first sub-pixel 111 of the first pixel unit, the 2 photodiodes 2 of a second pixel unit are located in a second sub-pixel 111 of the second pixel unit, and the 2 photodiodes of a third pixel unit are located in a third sub-pixel 111 of the third pixel unit.

In one embodiment, along the row direction of the matrix, every 3 sub-pixels 111 (including one R sub-pixel, one G sub-pixel and one B sub-pixel therein) form a pixel unit 11, and then in the 3 pixel units 11 in any row, 2 photodiodes are disposed in the first sub-pixel 111 (the R sub-pixel) in the first pixel unit 11, 2 photodiodes are disposed in the second sub-pixel 111 (the G sub-pixel) in the second pixel unit 11, and 2 photodiodes are disposed in the third sub-pixel 111 (the B sub-pixel) in the third pixel unit 11.

In one embodiment, along the column direction of the matrix, every 3 sub-pixels 111 (including one R sub-pixel, one G sub-pixel and one B sub-pixel therein) form a pixel unit 11, and then in the 3 pixel units 11 in any column, 2 photodiodes are disposed in the first sub-pixel 111 (the R sub-pixel) in the first pixel unit 11, 2 photodiodes are disposed in the second sub-pixel 111 (the G sub-pixel) in the second pixel unit 11, and 2 photodiodes are disposed in the third sub-pixel 111 (the B sub-pixel) in the third pixel unit 11.

Exemplarily, at the step S3a and the step S3b, a way of nanometer imprinting with low production cost and a high efficiency may be chosen to form a lens on the surface of the second substrate base-plate facing away from the first substrate base-plate, wherein the orthographic projection of the lens on the first substrate base-plate covers a photodiode corresponding to the lens, such that each photodiode may perform photoelectric conversion on the light of the target area obtained by the corresponding lens, to attain a photoelectric signal for generating the target area image.

An embodiment of the disclosure further provides a display apparatus. In particular, as shown in FIG. 4, the display apparatus includes an integrated display panel 101 as described above and a signal processing circuit 102 coupled to each of the photodiodes 2 in the integrated display panel, which signal processing circuit 102 is configured to process electric signals obtained by at least part of the plurality of photodiodes for forming a target area image, to get a RGB potential signal of the target area image, and cause the integrated display panel to display the target area image.

The beneficial effects of the display apparatus are the same as those of the integrated display panel in the above embodiments, and will not be repeated here any longer.

Figure 4:
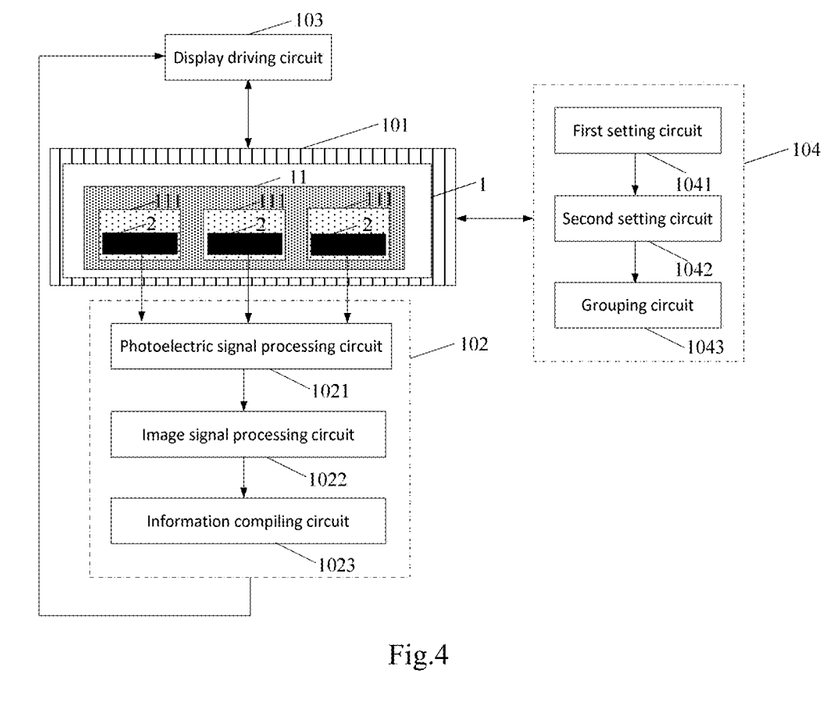
FIG. 4 is a structure diagram of a display apparatus provided by an embodiment of the disclosure.

Exemplarily, as shown in FIG. 4, the display apparatus may further include a display driving circuit 103 for driving the integrated display panel, the display driving circuit 103 is coupled to the integrated display panel 101, and the display driving circuit 103 may be integrated together with the signal processing circuit 102, which may thus simplify the structure of the display apparatus, save the internal space of the display apparatus, and improve the utilization of the internal space of the display apparatus. Exemplarily, the display driving circuit and the signal processing circuit may be integrated in a driving chip of the integrated display substrate, and so on.

In certain exemplary embodiments, as shown in FIG. 4, when in the integrated display panel 101, the plurality of photodiodes 2 form an image acquisition circuit of at least one camera, the display apparatus further includes a camera setting circuit 104 coupled to the integrated display panel 101, which camera setting circuit 104 is configured to receive the settings of the number of cameras in the integrated display panel 101 and the resolution of each of the cameras, and group the plurality of photodiodes 2 in the integrated display panel 101 according to the number of the cameras and the resolution of each of the cameras, such that the number of groups of the photodiodes 2 is equal to the number of the cameras. At this point, the signal processing circuit 102 is configured to process electric signals obtained by individual groups of the plurality of photodiodes 2 for forming the target area image, to get source file information of a plurality of target area sub-images in a one-to-one correspondence with a plurality of groups of photodiodes, and process the source file information of the plurality of target area sub-images, to attain the RGB potential signal of the target area image. Exemplarily, after the number of cameras in the integrated display panel 101 and the resolution of each of the cameras are set by the user according to his own needs, the camera setting circuit 104 may group the plurality of photodiodes 2 in the integrated display panel 101 according to the number of the cameras and the resolution of each of the cameras, such that the number of groups of the photodiodes 2 is equal to the number of the cameras. Then, the signal processing circuit 102 may process obtained electric signals for forming the target area image, to get source file information of a plurality of target area sub-images in a one-to-one correspondence with a plurality of groups of photodiodes, and process the source file information of the plurality of target area sub-images, to attain the RGB potential signal of the target area image which satisfies the user's needs and has a target resolution, realizing the adjustability of the resolution of a camera in the display apparatus.

It may be appreciated that, the number of groups of the photodiodes is determined according to the number of cameras set by the user, whereas the number of photodiodes in each group of photodiodes is determined according to the resolution of a camera corresponding to the group of photodiodes.

In certain exemplary embodiments, as shown in FIG. 4, when the display substrate 1 includes a plurality of sub-pixels 111, and in the sub-pixels 111 are disposed photodiodes 2, the camera setting circuit 104 may include a first setting circuit 1041, a second setting circuit 1042 and a grouping circuit 1043.

In particular, the first setting circuit 1041 is configured to set the number of groups of sub-pixels according to the number of the cameras, such that the number of the groups of sub-pixels is equal to the number of the cameras, the second setting circuit 1042 is configured to get the number of sub-pixels in which a photodiode is disposed in the group of sub-pixels corresponding to each of the cameras according to the resolution of each of the cameras, such that the number of the sub-pixels in which a photodiode is disposed in the group of sub-pixels corresponds to the resolution of the corresponding camera, and the grouping circuit 1043 is configured to group the sub-pixels in which a photodiode is disposed according to the number of the groups of sub-pixels and the number of the sub-pixels in which a photodiode is disposed in each of the groups of sub-pixels.

For example, one display substrate includes a plurality of R sub-pixels, G sub-pixels and B sub-pixels, and each of the sub-pixels includes one photodiode, one R sub-pixel, one G sub-pixel and one B sub-pixel may form one pixel unit of a camera, and then it may be possible to set the number of pixel units of a camera by setting the number of sub-pixels, thereby setting the resolution of the camera.

For example, there are 2 cameras in the integrated display panel, the resolution of one camera is 5 million, and the resolution of the other camera is 8 million. Then, the sub-pixels in which a photodiode is disposed in the display substrate may be grouped into two groups. The camera with the 5 million resolution includes 5 million camera pixel units, each of the camera pixel units includes 3 sub-pixels in which a photodiode is disposed (one R sub-pixel in which a photodiode is disposed, one G sub-pixel in which a photodiode is disposed, and one B sub-pixel in which a photodiode is disposed), and then in the group of sub-pixels corresponding to the camera with the 5 million resolution, the number of the sub-pixels in which a photodiode is disposed is 5 million times 3. Likewise, it may be possible to get the number of the sub-pixels in which a photodiode is disposed in the group of sub-pixels corresponding to the camera with the 8 million resolution, which will not be repeated by the embodiments of the disclosure any longer.

Exemplarily, as shown in FIG. 4, the signal processing circuit 102 may include a photoelectric signal processing circuit 1021, an image signal processing circuit 1022 and an information compiling circuit 1023 coupled in sequence. Therein, the photoelectric signal processing circuit 1021 is configured to process electric signals obtained by the plurality of groups of photodiodes for forming the target area image, to get the source file information of the plurality of target area sub-images in a one-to-one correspondence with the electric signals obtained by the plurality of groups of photodiodes for forming the target area image; the image signal processing circuit 1022 is configured to synthesize the source file information of the plurality of target area sub-images, to attain the source file information of the target area image, and the information compiling circuit 1023 is configured to get the RGB potential signal of the target area image according to the source file information of the target area image.

The display driving circuit 103 may receive the RGB potential signal of the target area image sent by the signal processing circuit 102 and drive the integrated display panel 101 to display the target area image according to the RGB potential signal of the target area image.

Exemplarily, the above involved various circuits for performing related functions, for example, the signal processing circuit, the camera setting circuit, etc., may all be realized by a processor with a logic operation function, which processor achieves a corresponding circuit function by executing related operation instructions. For example, the processor may be a universal central processing unit CPU, and the CPU is caused to perform a function of a controller by connecting the circuit of a related component to the bus of the CPU or inputting related instructions to the CPU or reading corresponding instructions and data. For example, the processor may be a dedicated processor, for example, a single chip microcomputer CPU, a programmable logic array FPGA, an application specific integrated circuit ASIC, a digital processor DSP, etc. which is designed for performing functions including those of the above various related circuits, and it is caused to perform a function of a controller by connecting the circuit of a related component to the pins of the dedicated processor or inputting related instructions to the dedicated processor or reading corresponding instructions and data. For example, the processor may be an integrated circuit IC which encapsulates an operation instruction set of the functions of the above various related circuits, to implement the functions of the various related circuits with a high efficiency and low power consumption.

Figure 5:
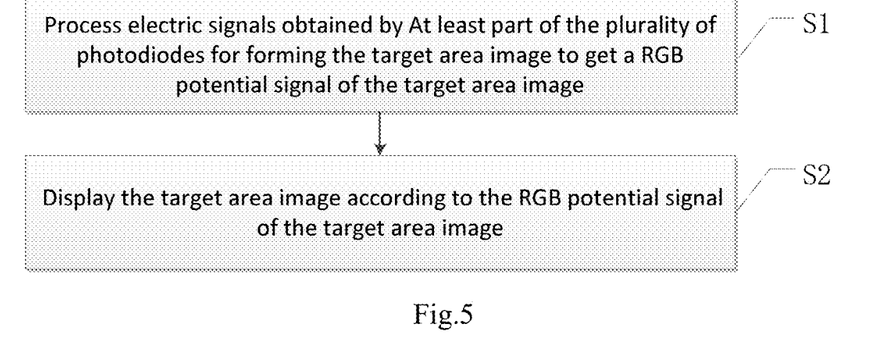
FIG. 5 is a flow chart of an image display method provided by an embodiment of the disclosure.

In addition, an embodiment of the disclosure further provides an image display method for displaying a target area image acquired by a display apparatus described above. In particular, as shown in FIG. 5, the image display method includes: step S1, processing electric signals obtained by at least part of the plurality of photodiodes for forming the target area image to get a RGB potential signal of the target area image, and step S2, displaying the target area image according to the RGB potential signal of the target area image.

Exemplarily, when the plurality of photodiodes are used to form an image acquisition circuit of at least one camera, and the display apparatus includes a camera setting circuit coupled to the photodiodes, which camera setting circuit is configured to receive the settings of the number of cameras in the integrated display panel and the resolution of each of the cameras, and group the plurality of photodiodes in the integrated display panel according to the number of the cameras and the resolution of each of the cameras, such that the number of groups of the photodiodes is equal to the number of the cameras, as shown in FIG. 6, at the step S1, a specific step of processing electric signals obtained by at least part of the plurality of photodiodes for forming the target area image to get a RGB potential signal of the target area image includes: step S11, receiving the settings of the number of cameras and the resolution of each of the cameras by the camera setting circuit in the display apparatus, wherein the number of the cameras is N, and the resolution of the i-th camera is $X_i$, wherein i=1, 2, ..., N, and N is an integer greater than or equal to 1, step S21, grouping the plurality of photodiodes in the integrated display panel according to the number of the cameras and the resolution of each of the cameras, such that the number of groups of the photodiodes is equal to the number of the cameras, step S31, acquiring light signals of a target area by the photodiodes in the image acquisition circuits of N cameras as described, and converting the acquired light signals of the target area into electric signals for forming the target area image, to get N electric signals for forming the target area image, and step S41, processing the N electric signals for forming the target area image respectively by the signal processing circuit in the display apparatus, to get the source file information of N acquired target area sub-images, and processing the source file information of the N target area sub-images to attain the RGB potential signal of the target area image.

The beneficial effects of the image display method are the same as those of the integrated display panel in the above embodiments, and will not be repeated here any longer.

Exemplarily, as shown in FIG. 7, the display substrate includes a plurality of sub-pixels, in the sub-pixels are disposed the photodiodes, and the camera setting circuit includes a first setting circuit, a second setting circuit and a grouping circuit, and at the step S21, a specific step of grouping the plurality of photodiodes in the integrated display panel according to the number of the cameras and the resolution of each of the cameras, such that the number of groups of the photodiodes is equal to the number of the cameras, includes: step S211, setting the number of groups of sub-pixels by the first setting circuit according to the number N of the cameras, such that the number of the groups of sub-pixels is equal to the number of the cameras, step S212, getting the number of sub-pixels in which a photodiode is disposed in the group of sub-pixels corresponding to each of the cameras by the second setting circuit according to the resolution of each of the cameras, such that the number of the sub-pixels in which a photodiode is disposed in the group of sub-pixels corresponds to the resolution of the corresponding camera, and step S213, grouping the sub-pixels in which a photodiode is disposed by the grouping circuit according to the number of the groups of sub-pixels and the number of the sub-pixels in which a photodiode is disposed in each of the groups of sub-pixels.

Exemplarily, at the step S41, the signal processing circuit may include a photoelectric signal processing circuit, an image signal processing circuit and an information compiling circuit coupled in sequence, and a specific step of processing the N electric signals for forming the target area image respectively, to get the source file information of N acquired target area sub-images, and processing the source file information of the N target area sub-images to attain the RGB potential signal of the target area image at the step S41, includes:

step S411, processing the N electric signals for forming the target area image respectively by the photoelectric signal processing circuit, to get the source file information of N target area sub-images, step S412, synthesizing the source file information of the N target area sub-images by the image signal processing circuit, to attain the source file information of the target area image, and step S413, getting the RGB potential signal of the target area image by the information compiling circuit according to the source file information of the target area image.

What are described above are just specific implementations of the embodiments of the disclosure, however, the protection scope of the embodiments of the disclosure is not limited thereto, and variations or alternatives easily occurring to any artisan familiar with the technical field within the technical scope disclosed by the embodiments of the disclosure should all be encompassed within the protection scope of the disclosure. Therefore, the protection scope of the disclosure should be subject to the protection scope of the claims.

The invention claimed is:

1. A display apparatus, comprising an integrated display panel and a signal processing circuit coupled to each of the photodiodes in the integrated display panel, wherein the signal processing circuit is configured to process electric signals obtained by at least part of the plurality of photodiodes for forming a target area image to acquire a RGB potential signal of the target area image and cause the integrated display panel to display the target area image, the plurality of photodiodes form an image acquisition circuit of at least one camera, the display apparatus further comprising a camera setting circuit coupled to the integrated display panel, wherein the camera setting circuit is configured to receive the settings of the number of cameras in the integrated display panel and the resolution of each of the cameras and group the plurality of photodiodes in the integrated display panel according to the number of the cameras and the resolution of each of the cameras such that the number of groups of the photodiodes is equal to the number of the cameras, and the signal processing circuit is configured to process electric signals obtained by individual groups of the plurality of photodiodes for forming the target area image, to acquire source file information of a plurality of target area sub-images corresponding to a plurality of groups of photodiodes and process the source file information of the plurality of target area sub-images to attain the RGB potential signal of the target area image.

2. The display apparatus as claimed in claim 1, wherein the display substrate includes a plurality of sub-pixels, and the photodiodes are located in the sub-pixels, the camera setting circuit includes a first setting circuit, a second setting circuit and a grouping circuit, the first setting circuit is configured to set the number of groups of sub-pixels according to the number of the cameras, such that the number of the groups of sub-pixels is equal to the number of the cameras, the second setting circuit is configured to get the number of sub-pixels in which a photodiode is disposed in the group of sub-pixels corresponding to each of the cameras according to the resolution of each of the cameras, such that the number of the sub-pixels in which a photodiode is disposed in the group of sub-pixels corresponds to the resolution of the corresponding camera, and the grouping circuit is configured to group the sub-pixels in which a photodiode is disposed according to the number of the groups of sub-pixels and the number of the sub-pixels in which a photodiode is disposed in each of the groups of sub-pixels.

3. The display apparatus as claimed in claim 1, wherein the signal processing circuit comprises a photoelectric signal processing circuit, an image signal processing circuit and an information compiling circuit coupled in sequence, the photoelectric signal processing circuit is configured to process electric signals obtained by the plurality of groups of photodiodes for forming the target area image respectively, to get the source file information of the plurality of target area sub-images, the image signal processing circuit is configured to synthesize the source file information of the plurality of target area sub-images, to attain the source file information of the target area image, and the information compiling circuit is configured to get the RGB potential signal of the target area image according to the source file information of the target area image.

4. The display apparatus as claimed in claim 1, wherein the display apparatus further includes a display driving circuit integrated together with the signal processing circuit, which display driving circuit is coupled to the integrated display panel, and configured to receive the RGB potential signal of the target area image sent by the signal processing circuit and drive the integrated display panel to display the target area image according to the RGB potential signal of the target area image.

5. The display apparatus as claimed in claim 1, wherein the display substrate includes a plurality of sub-pixels, each of which comprising at least one of the plurality of photodiodes.

6. The display apparatus as claimed in claim 1, wherein the display substrate includes Q sub-pixels grouped into M pixel units, wherein each of the M pixel units each includes K sub-pixels, and wherein Q=K*M, and Q, M and K are integers greater than or equal to 1, in each of the pixel units are disposed F photodiodes, the F photodiodes in each of the pixel units are located in the same sub-pixel, and in every K pixel units arranged in sequence, the F photodiodes of an i-th pixel unit are located in an i-th sub-pixel of the i-th pixel unit, wherein F is an integer greater than or equal to 1, and i is a positive integer less than or equal to K.

7. An image display method, being used for displaying a target area image acquired by a display apparatus as claimed in claim 1, which image display method includes:

processing electric signals obtained by at least part of the plurality of photodiodes for forming the target area image to get a RGB potential signal of the target area image, and displaying the target area image according to the RGB potential signal of the target area image, wherein the plurality of photodiodes form an image acquisition circuit of at least one camera, the display apparatus includes a camera setting circuit coupled to the photodiodes, which camera setting circuit is configured to receive the settings of the number of cameras in the integrated display panel and the resolution of each of the cameras, and group the plurality of photodiodes in the integrated display panel according to the number of the cameras and the resolution of each of the cameras, such that the number of groups of the photodiodes is equal to the number of the cameras, and the signal processing circuit is configured to process electric signals obtained by individual groups of the plurality of photodiodes for forming the target area image, to acquire source file information of a plurality of target area sub-images corresponding to a plurality of groups of photodiodes and process the source file information of the plurality of target area sub-images to attain the RGB potential signal of the target area image.

8. The image display method as claimed in claim 7, wherein a specific step of processing electric signals obtained by at least part of the plurality of photodiodes for forming the target area image to get a RGB potential signal of the target area image includes:

receiving the settings of the number of cameras and the resolution of each of the cameras by the camera setting circuit in the display apparatus, wherein the number of the cameras is N, and the resolution of the i-th camera is $X_i$, wherein i=1, 2, ..., N, and N is an integer greater than or equal to 1, grouping the plurality of photodiodes in the integrated display panel according to the number of the cameras and the resolution of each of the cameras, such that the number of groups of the photodiodes is equal to the number of the cameras, acquiring light signals of a target area by the photodiodes in the image acquisition circuits of N cameras as described, and converting the acquired light signals of the target area into electric signals for forming the target area image, to get N electric signals for forming the target area image, and processing the N electric signals for forming the target area image respectively by the signal processing circuit in the display apparatus, to get the source file information of N acquired target area sub-images, and processing the source file information of the N target area sub-images to attain the RGB potential signal of the target area image.

9. The image display method as claimed in claim 8, wherein the display substrate includes a plurality of sub-pixels, the photodiodes are disposed in the sub-pixels, and the camera setting circuit includes a first setting circuit, a second setting circuit and a grouping circuit, a specific step of grouping the plurality of photodiodes in the integrated display panel according to the number of the cameras and the resolution of each of the cameras, such that the number of groups of the photodiodes is equal to the number of the cameras, includes:

setting the number of groups of sub-pixels by the first setting circuit according to the number N of the cameras, such that the number of the groups of sub-pixels is equal to the number of the cameras, getting the number of sub-pixels in which a photodiode is disposed in the group of sub-pixels corresponding to each of the cameras by the second setting circuit according to the resolution of each of the cameras, such that the number of the sub-pixels in which a photodiode is disposed in the group of sub-pixels corresponds to the resolution of the corresponding camera, and grouping the sub-pixels in which a photodiode is disposed by the grouping circuit according to the number of the groups of sub-pixels and the number of the sub-pixels in which a photodiode is disposed in each of the groups of sub-pixels.

10. The image display method as claimed in claim 8, wherein the signal processing circuit includes a photoelectric signal processing circuit, an image signal processing circuit and an information compiling circuit coupled in sequence, and
- a specific step of processing the N electric signals for forming the target area image respectively, to get the source file information of N acquired target area sub-images, and processing the source file information of the N target area sub-images to attain the RGB potential signal of the target area image, includes:
- processing the N electric signals for forming the target area image respectively by the photoelectric signal processing circuit, to get the source file information of N target area sub-images,
- synthesizing the source file information of the N target area sub-images by the image signal processing circuit, to attain the source file information of the target area image, and
- getting the RGB potential signal of the target area image by the information compiling circuit according to the source file information of the target area image.

* * * * *